Figure 1:
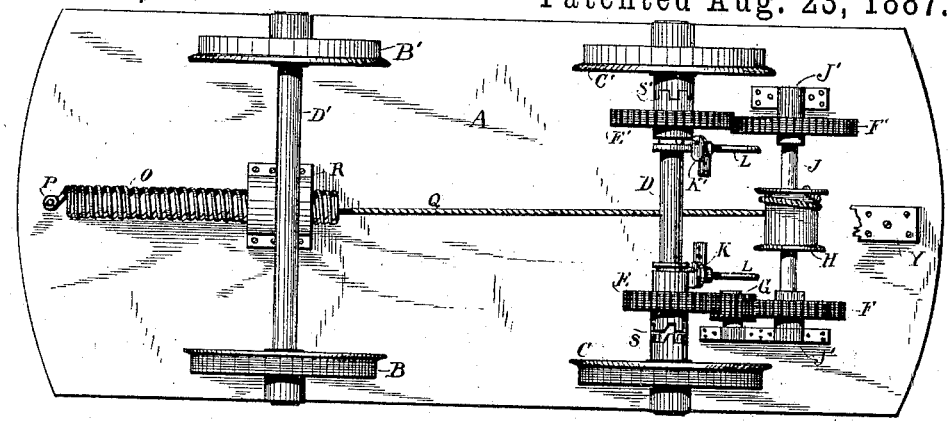

(No Model.)

J. R. TRACY.
CAR STARTER.

No. 368,695. Patented Aug. 23, 1887.

Witnesses:
Wesley Smith
Carroll J. Webster

Inventor.
Joseph Rex Tracy
By William Webster
his Atty

UNITED STATES PATENT OFFICE.

JOSEPH REX TRACY, OF TOLEDO, OHIO.

CAR-STARTER.

SPECIFICATION forming part of Letters Patent No. 368,695, dated August 23, 1887.

Application filed May 5, 1887. Serial No. 237,291. (No model.)

*To all whom it may concern:*

Be it known that I, JOSEPH REX TRACY, a citizen of the United States, residing at Toledo, in the county of Lucas and State of Ohio, have invented certain new and useful Improvements in Car-Starters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a car-starter, and has for its object to provide a device that shall store up power by the inertia of the car to be utilized in starting the car from a state of rest either in a forward or reverse direction, as desired, provision being made for retaining the stored power to be used at the will of the operator.

Without particularizing as to the different styles of cars and the uses to which my device is applicable, I will proceed to describe the same as applied to an ordinary street-car wherein it is desired to relieve the animal power employed from the great strain incident to starting a car from a state of rest to one of motion—a necessity of such frequent occurrence as to be the greatest cause of wear and fatigue to the animal power. I attain these objects by the mechanism illustrated in the drawings, in which—

Figure 2:
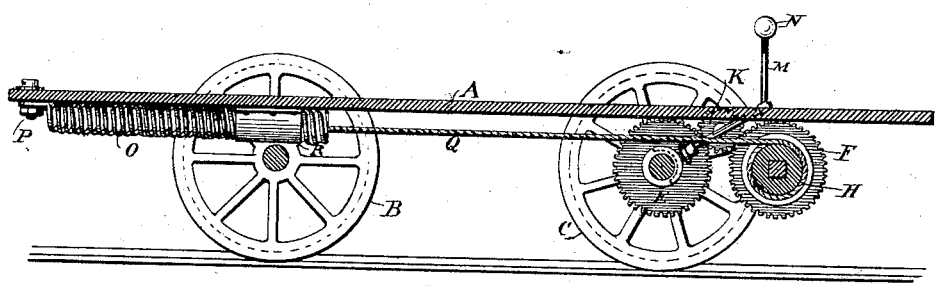
Figure 3:
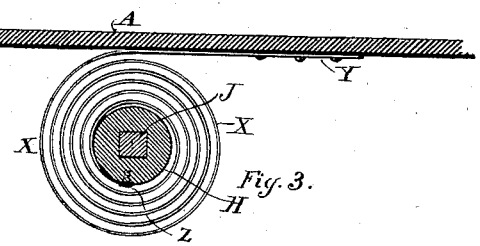

Figure 1 is a plan view of the bottom of a car, showing my device attached. Fig. 2 is a longitudinal vertical section of the same when upon the track, the wheels of one side removed, the better to show the spiral spring and a portion of the actuating mechanism. Fig. 3 illustrates a modified form of spring.

Like letters of reference indicate like parts throughout the several views.

A designates the bottom of a car mounted upon front and rear axles, D D', having wheels C C' and B B', respectively. To the bottom of the car at P is attached a coil-spring, O, passing through a semicircular metal shield, R, located at or near the rear axle, D', and attached to the bottom of the car. To the forward end of spring O is attached a rope, Q, having its forward end attached to a drum, H, rigidly attached to a transverse shaft, J, journaled in bearings J' at the forward part of the car near each end of shaft J, and rigidly attached thereon are gear-wheels F and F', the gear F meshing with an idle-pinion, G, mounted upon a stud, G', attached to the bottom of the car, the pinion G meshing with a gear-wheel, E, loosely mounted upon the front axle, D.

Gear E is provided with a clutch-collar upon the inner side or portion of its hub and a clutch-face upon its outer end, the projections upon the clutch-face having one side square, the opposite side being inclined, as shown. This portion of clutch intermeshes with one of similar construction having the straight and inclined portions in reverse order and formed upon the hub of car-wheel C. The clutch thus formed is designated by letter S. Gear F' intermeshes with a gear, E', loosely journaled upon axle D and provided with a clutch-collar, its hub at the outer side having a clutch-face meshing with a corresponding clutch upon car-wheel C', forming clutch S'.

L L are shafts journaled in bearings upon the car-floor, and inclined from thence to a point contiguous to the clutch-collars, and having eccentrics K' upon their lower ends, to which are attached projecting bifurcated arms partially embracing the collars of the clutches. By this construction, when either of the shafts L is turned, the gears E or E' are moved into or out of engagement with the clutch portion of the car-wheel with which they co-operate. There is attached to the shafts L L at their upper ends levers M, having their upper ends weighted, as at N. Since these levers are similar in construction and operation, but one is shown in the drawings.

In operation, when it is necessary to stop the car to admit a passenger, and before the car has come to a rest, clutch S' is thrown into engagement, thereby revolving gears E' and F', revolving drum H, winding rope Q thereon, thereby putting spring O under tension. Clutch S is now thrown into engagement and the car brought to a rest. The train of gearing is locked from revolution in either direction, thereby retaining the stored power to be used at the will of the operator.

If it is desired to move the car forward, clutch S' is disengaged. Spring O and rope Q, acting upon drum H, revolve the same, communicating a forward movement to the car through the medium of gears F E and idler G.

Should it be desired to move the car in a reverse direction, clutch S is disengaged, gear F' acting upon gear E', the car is moved backward, gear E being automatically unclutched by the inclined sides of the clutch-face riding up the corresponding inclines of the projections on the hub of wheel C, the weight N of lever M acting upon the eccentric, and clutch-lever, after lever M has passed a vertical, tends to accelerate and fully accomplish the disengagement.

Referring to Fig. 3, wherein is shown a modified form of spring, which may in some instances be preferred to the coil-spring O, X designates a flat helical spring attached to the bottom of the car at Y and to the drum at Z. Its operation is the same as the spring previously described, being brought under tension by the same manipulation of the clutches and effecting the same results when unwinding.

It is evident that slight modifications may be made without departing from the spirit of my invention—as, for example, the clutch portion of the hubs of wheels C and C' may be omitted and supplemental collars having clutch-faces splined upon the shaft. Idler G may also be placed intermediate gears E and F, if desired. I may also substitute for the springs shown any form of spring adaptable.

My device is simple, effective, inexpensive of construction, and can be attached to any of the forms of car now in use without necessity of modifying their construction.

Having described my invention, what I claim, and desire to secure by Letters Patent, is—

1. In a car-starter, a clutch-face rigidly connected with the car-axle near one end, a clutch-face having straight and inclined projections rigidly attached near the opposite end, gears loosely journaled upon the axle, having square and inclined clutch portions, respectively, and weighted levers for moving the clutch portions of the gears into engagement with the rigid clutch-faces, whereby a train of gearing is caused to revolve a drum, thereby causing tension of a spring adapted to move the car in either direction, at the will of the operator, or to store the power by engagement of both clutches, as and for the purpose set forth.

2. In a car-starter, an axle provided with clutch-faces having square and inclined portions, respectively, adapted to engage with corresponding projections upon gears journaled upon the axle, weighted levers for moving the geared portions into engagement, a train of gearing meshing with one of the gears adapted to move the car forward, and a train to move the car in a reverse direction, the incline projections of the clutch-faces co-operating with the weighted levers to automatically unclutch the parts when the movement of the car is reversed, as and for the purpose set forth.

In testimony that I claim the foregoing as my own I hereby affix my signature in presence of two witnesses.

JOSEPH REX TRACY.

Witnesses:
WILLIAM WEBSTER,
JAMES E. RAYMER.